United States Patent [19]

Tada et al.

[11] Patent Number: 5,544,359
[45] Date of Patent: Aug. 6, 1996

[54] APPARATUS AND METHOD FOR CLASSIFYING AND ACQUIRING LOG DATA BY UPDATING AND STORING LOG DATA

[75] Inventors: Masayuki Tada; Hitoshi Suzuki, both of Kawasaki, Japan

[73] Assignee: Fujitsu Limited, Japan

[21] Appl. No.: 204,504

[22] Filed: Mar. 2, 1994

[30] Foreign Application Priority Data

Mar. 30, 1993 [JP] Japan .................................. 5-072585

[51] Int. Cl.⁶ .................................................. G06F 17/40
[52] U.S. Cl. .................... 395/600; 395/650; 395/200.03; 395/182.13; 364/222.81; 364/DIG. 1; 364/DIG. 2; 364/962
[58] Field of Search ........................ 395/600, 575, 395/250, 425, 325, 700

[56] References Cited

U.S. PATENT DOCUMENTS

| | | | |
|---|---|---|---|
| 4,159,517 | 6/1979 | Paradine et al. ................... | 395/250 |
| 4,507,751 | 3/1985 | Gawlick et al. .................... | 364/900 |
| 5,043,866 | 8/1991 | Myre, Jr. et al. .................. | 364/200 |
| 5,043,871 | 8/1991 | Nishigaki et al. .................. | 395/600 |
| 5,115,392 | 5/1992 | Takamoto et al. .................. | 395/650 |
| 5,140,689 | 8/1992 | Kobayashi ......................... | 395/575 |
| 5,151,988 | 9/1992 | Yamagishi ......................... | 395/600 |
| 5,193,188 | 3/1993 | Franaszek et al. .................. | 395/650 |
| 5,201,044 | 4/1993 | Frey, Jr. et al. ................... | 395/575 |
| 5,280,611 | 1/1994 | Mohan et al. ...................... | 395/600 |
| 5,319,780 | 6/1994 | Catino et al. ...................... | 395/600 |
| 5,333,314 | 7/1994 | Masai et al. ....................... | 395/600 |
| 5,390,302 | 2/1995 | Johnson et al. .................... | 395/325 |

FOREIGN PATENT DOCUMENTS

| | | |
|---|---|---|
| A-0097234 | 1/1984 | European Pat. Off. . |
| A-0250847 | 1/1988 | European Pat. Off. . |
| A-0420425 | 4/1991 | European Pat. Off. . |
| 59-58566 | 2/1984 | Japan . |
| 60-2036 | 3/1985 | Japan . |
| 61-133450 | 5/1986 | Japan . |
| 64-21649 | 8/1989 | Japan . |
| 3-27184 | 6/1991 | Japan . |

OTHER PUBLICATIONS

Akhil Kumar, "a crash recovery algorithm based on multiple logs that exploits parallelism." IEEE, 1990, pp. 156–159.

*Primary Examiner*—Thomas G. Black
*Assistant Examiner*—C. Pham
*Attorney, Agent, or Firm*—Staas & Halsey

[57] ABSTRACT

Historical log data for a plurality of databases are classified for the individual databases. Alternatively, the historical log data associated with the database and user log data are classified. The classified log data are stored in a plurality of volatile buffers. When the nonvolatile buffers are full, the contents of the nonvolatile buffers are temporarily written into the historical log files, following which the classified log data are stored in the nonvolatile buffers.

16 Claims, 11 Drawing Sheets

APPARATUS AND METHOD FOR CLASSIFYING AND ACQUIRING LOG DATA BY UPDATING AND STORING LOG DATA

BACKGROUND OF THE INVENTION

1. Field of the Invention

This invention relates to a management system for log data for use in recovery from crashes in a database.

2. Description of the Related Art

In a database system, the following recovery process is applied to prevent data loss when a system goes down. Backup files are maintained to store the most recent version of the data, and used commands are chronologically recorded as a log file. If the system goes down, it is brought back to its status at the time when a failure stopped the operation. In this event, the recovery process reruns the commands stored in the log file to the backup file. The present invention is directed to establish a management system for the log file used in this way.

To facilitate understanding of the log file, updating of the database is first described. In a database system (hereinafter, also referred to as DB system), the management system performs transactions that update the database (hereinafter, also referred to as DB). The transaction is a collection of operations for performing a complete data operation. The transaction has features of completeness and continuity. The completeness means "a status of the transaction is either successful or failure." The continuity means "a processing of a successful transaction will be ensured permanently."

In the DB system, a history of all the updating operations made to the database (hereinafter, also referred to as a log data DB system) are recorded in a historical log file (HLF) to realize the transactions having the above mentioned features. The transaction is ended at the time when the log data are ensured in the historical log file (HLF), i.e., when the log data are recorded positively in the historical log file (HLF).

FIG. 10 is a system structural diagram for use in illustrating an update processing made to the DB. The database system comprises a plurality of terminals, allowing common use of the data stored in the database accessed by two or more persons. In FIG. 10, a terminal A (200a) and a terminal B (200b) are shown as the terminals. The database (hereinafter, represented by two databases DB-1 (201a) and DB-2 (201b)) is typically stored in an external storage (a first external storage (202)). The external storage (202) is connected to a central processing unit (203). Application programs A and B for use in accessing to the databases are operated on a main memory (204) of the central processing unit (203). The central processing unit (203) is also connected to a second external storage (205) that is used for recording the historical log file (206). The historical log file (HLF)(206) is written in this second external storage (205) by a HLF writing processing unit (204a) on the main memory (204).

DB update processing procedures are described in conjunction with FIG. 10.

(1) When the application program A is initiated, the application program A issues a READ macro instruction to read an electronic message. During processing the READ macro instruction, a transaction start (TRAN-START) macro instruction is issued. Subsequently, the application program A enters the wait state to wait a processing request from the terminal A (200a).

(2) When a processing request on the electronic message is supplied from the terminal A (200a), the application program A receives it. This releases (posts) the application program A from the wait state.

(3) The application program A reads the DB-1 (201a) out of the first external storage (202) to the main memory (204).

(4) The application program A changes on the main memory the contents of the DB-1 (201a) read.

(5) The application program A issues a WRITE macro instruction. During processing of the WRITE macro instruction, a transaction end (TRN-END) macro instruction is issued.

(6) An operation system (OS) requires the HLF writing processing unit (204a) to write the log data into the HLF (206) in the second external storage (205). (1)'–(6)' The same processing as those carried out on the processing request from the terminal A is repeated on the processing request from the terminal B. The processing in (1)–(6) are carried out in parallel to the processing in (1)'–(6)'.

(7) The HLF writing processing unit (204a) writes the log data into the historical log file (206) in response to the instruction supplied from the operation system (OS).

(8) The operation system (OS) notifies the application program A of completion of the log data writing processing into the historical log file (206).

(9) The database DB-1 (201a) changed on the main memory (204) is written into the first external storage (202).

(10) The application program A notifies the terminal A of completion of the update processing to the DB. (7)'–(10)' The same processing as those carried out on the processing request from the terminal A is repeated on the processing request from the terminal B.

Next, processing to acquire the log data is described.

FIG. 11 is a block diagram for use in describing processing to acquire the log data. In this event, the first external storage (202) is provided for the database (DB-1 (201a) and DB-2 (201B)) while the second external storage (205) is provided for the historical log file (206). Provided on the main memory (204) are a buffer (208) for updating the database and a HLF buffer (209) for temporary storing the historical log before writing into the historical log file (206). In FIG. 11, it is assumed that an application program C is loaded on the main memory (204) to access to the databases DB-1 (201a) and DB-2 (201b) successively. Described is processing to acquire the log data in a case of FIG. 11.

(1) When the application program C is initiated, the application program C issues a READ macro instruction. During processing of the READ macro instruction, a transaction start (TRAN-START) macro instruction is issued.

(2) The application program C issues a GET macro instruction to get the database DB-1 (201a). Issue of this GET macro instruction permits the application program C to access to the database DB-1 (201a) exclusively.

(3) To use and update the data contained in the database DB-1 (201a) acquired, the application program C reads a page where the necessary data are stored to a DB updating buffer (208) on the main memory (204).

(4) The application program C issues a MODIFY macro instruction to modify the data content (referred herein to as "A") obtained from the database DB-1 (201a) read in the main memory (208).

(5) The data content is modified from A to A' on the DB updating buffer (208).

(6) A command used for updating in (5) is picked up from the DB updating buffer (208) and is transferred to the HLF buffer (209) as a log data. (2)'–(6)' The same operation as those carried out to the DB-1 is repeated to the DB-2.

(7) The application program C issues a write (WRITE) macro instruction. During processing of the WRITE macro instruction, a transaction end (TRN-END) macro instruction is issued.

(8) The contents of the HLF buffer (209) is written in the historical log file (206).

(9) The data A' on the DB updating buffer (208) is written in the DB-1 (201a).

(9)' A data B' on the DB updating buffer (208) is written in the DB-2 (201b).

As mentioned above, in the conventional database system, a plurality of log data obtained as a result of updating of a plurality of databases are successively stored in a single historical log file (206). In the conventional database system, statistical information for system tuning or accounting information for a user (hereinafter, referred to as a user data) are acquired for every one transaction, which are stored in the historical log file (206) together with the log data. The system tuning used herein means tuning of an I/O load of the database. The accounting information indicates a database fee.

When the system goes down, the command stored in the latest log file before the failure is executed. This allows recovery of the system from a failure to its status at the time when the failure stopped the operation. The term "failure" used herein includes a down to a system and crash of the database itself.

Following are, however, problems in the above mentioned conventional technique.

First, transaction processing cycles per a unit time is increased as the scale of the working is increased. Instead of this, the conventional database system transfers the log data for a plurality of databases to a single HLF buffer (209), following which these data are written together in a single historical log file (206). Accordingly, the processing performance on the transactions cannot be improved due to an I/O neck of the historical log file (206). The I/O neck is a problem occurred with the difference between the processing speed of the application program loaded on the main memory (204) and an access speed to the external storage (205), as the secondary storage. More specifically, the access time to the external storage (205) is significantly slower than the processing speed of the program on the main memory (204). This means that the increased number of the databases (201) require a longer time for writing the log data into the historical log file (206) in the external storage (205). In such a case, the processing speed of the whole system is restricted depending on the performance of the external storage (206).

Second, to recover the database (201), it is necessary to read the historical log file (206) and input the command(s) contained in the historical log file (206) into the processing device where the recovery process is executed. However, the conventional database system stores the log data for the individual databases (201) in the single historical log file (206) in the order of their occurrence. Accordingly, it is necessary upon recovery to retrieve the historical log file (206) and extract only the log data associated with the database to be recovered from crashes. As a result, the recovery and operation of the database becomes complex as the number of the databases is increased. Likewise, the number of the log data is increased as the number of the databases is increased. The increased number of log data results in a long period of processing for retrieving the log data relating to the database to be recovered from the historical log file (206). It is thus disadvantageous in that the necessary time for recovery is elongated.

Third, the conventional database system has a function of acquiring statistical information for system tuning or accounting information for a user for every one transaction to store them in the historical log file (206). However, the conventional database system stores the user data into the historical log file (206) together with the log data. It is thus necessary to extract the user data from the whole historical log file (206) for using the user data. In addition, the above mentioned storing method makes it necessary to retrieve only the log data from the historical log file (206) in which the user data are contained together with the user data. Accordingly, extremely long time is required to recover the database.

SUMMARY OF THE INVENTION

To overcome the above mentioned conventional problems, the present invention is an apparatus for classifying and acquiring log data in a database system that updates the data through execution of a transaction and stores the updated history as the log data in a storage comprising a log data acquiring unit for acquiring a log data by every transaction; a log data classifying unit for classifying the log data acquired by the log data acquiring unit according to a predetermined classification condition; a plurality of buffers for use in storing a plurality of historical log data classified by the log data classifying unit with being associated with classifications; and historical log files provided within the storage for writing therein the historical log data stored in the buffers, the historical log files being associated with the classifications.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

First Embodiment

Figure 1:
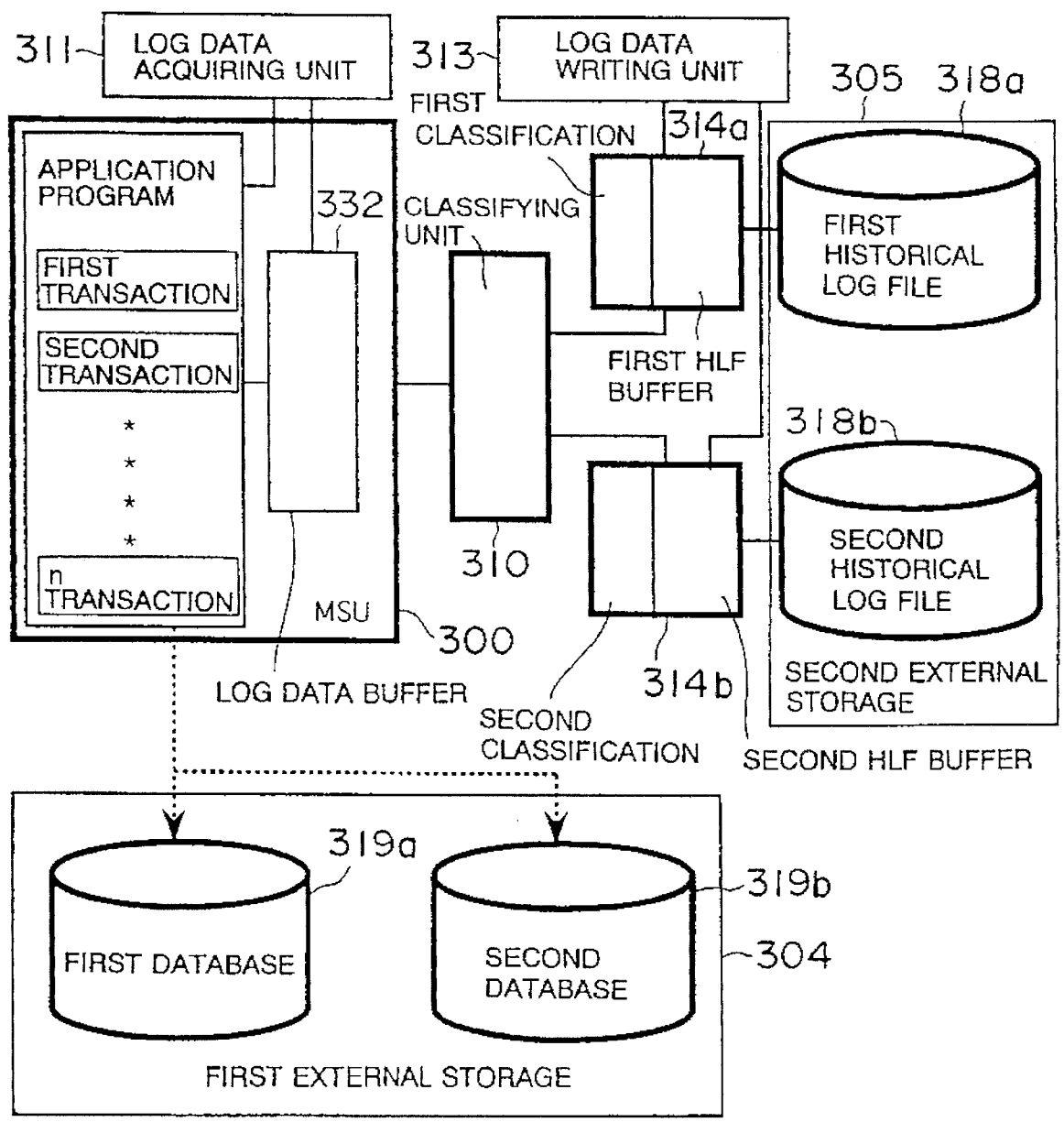
FIG. 1 is a block diagram showing the first embodiment of the present invention.

The first embodiment of the present invention is shown in FIG. 1. A feature of a log data acquiring apparatus according to this first embodiment is to have a plurality of historical log files (318a and 318b) and to classify the log data and store them in the individual historical log files (318a and 318b). Classification of the log data permits easy retrieval and reading of the necessary log data upon recovery of the system.

A database to which the log data classification and acquisition apparatus according to the first embodiment is applied comprises a main memory (300), a first external storage (304) and a second external storage (305). A first database (319a) and a second database (319b) are stored in the first external storage (304). The first and a second historical log files (318a, 318b) are stored in the second external storage (305). An application program containing a plurality of transactions is loaded on the main memory (300). The first and the second databases are accessible by means of executing these transactions.

A log data buffer (332) is present on the main memory (300). The log data buffer (332) stores various commands corresponding to the databases (319a, 319b) as the log data according to an instruction from a log data acquiring unit (311). The log data are classified by a classifying unit (310) and transferred to a first HLF buffer (314a) or a second HLF buffer (314b). The log data stored in the HLF buffer (314a) is written in the historical log file 318a for the database 1 by a log data writing unit 313. Likewise, the data stored in the second HLF buffer (314b) is written in the historical log file 318b for the database 2 by the log data writing unit 313.

How to classify the log data is described hereinafter. First, there is a prerequisite where the log data are classified for every one transaction resulting in the log data. As mentioned above, the transaction is a collection of operations for performing a complete data operation. The transaction has features of completeness and continuity. Accordingly, the log data should be managed for every one transaction to use in recovering the system. With this respect, it is provided in this embodiment with a log data acquiring unit 311 to acquire the log data for every one transaction. In other words, the log data are classified at the entrance for acquisition.

Next, the log data should be further classified even in the same transaction. In this embodiment, a classifying unit 310 is provided to this end. For example, the log data may be classified for each database. More specifically, the classifying unit 310 creates the historical log files for every individual databases. The log data for every individual databases are stored in the respective HLF buffers (314a and 314b).

The term "creating the historical log for every database" means creating them for every database when there are a plurality of databases. A case where there are a plurality of databases is such a case that a plurality of databases are present, i.e., a depositing database and a withdrawing database in an accounting database system. The present invention is also applicable to a case where a single database comprises a plurality of databases. In other words, when a plurality of database group or data file group are provided on a business basis, the historical log files may be created for each database forming the database group or data file group corresponding to each business unit, thereby the log data may be stored in each file. The case where there is a plurality of database group corresponding to each business unit may be, for example, a case there are an accounting system for clients and a salary system for bank clerks in a bank, in which a plurality of databases are provided for the individual business systems.

The classifying unit 310 may classify not only the log data for every database but also the log data and the user data.

In this embodiment, the log data classifying unit 310 classifies the log data. The classified data are stored in the historical log files (318a, 318b) being correspondent with the classification. This reduces the load of processing to write the data into the historical log files (318a, 318b). As a result, processing delay due to the I/O neck can be avoided.

The log data are classified previously before recovery of the system, so that retrieval and reading of the log data for the system recovery can be made at a high speed.

The log data writing unit (313) is capable of writing the individual historical log data corresponding to historical log files (318a, 318b) on the second external storage (305) supplied from the historical log file buffers (314a, 314b) in asynchronism with execution of the transactions. In addition, the log data writing unit 313 is capable of writing the log data into the historical log files (318a, 318b) supplied from the historical log file buffers (314a, 314b) in a parallel manner. These contribute to more effective reduction of abuse due to the I/O neck.

Second Embodiment

Figure 2:
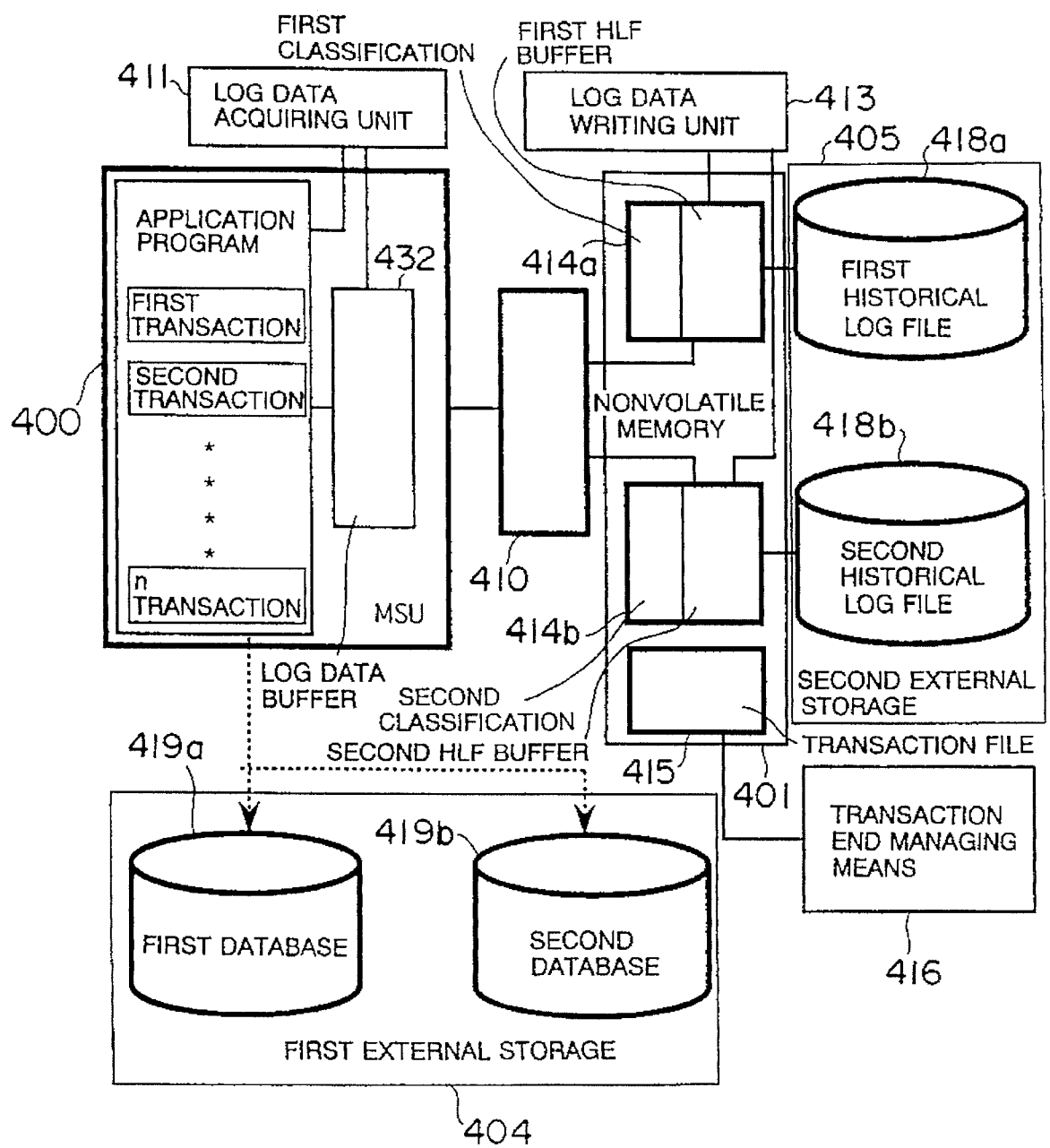
FIG. 2 is a block diagram showing the second embodiment of the present invention.

A second embodiment of the present invention is shown in FIG. 2. A feature of a log data acquiring apparatus according to this second embodiment is a point that HLF buffers (414a, 414b), corresponding to the first and the second HLF buffers (314a, 314b) in the first embodiment, are formed on a nonvolatile memory (401) particular on a nonvolatile mass storing memory (hereinafter, referred to as SSU). The nonvolatile memory is provided with a transaction file (415) other than the HLF buffers (414a, 414b). Used as the nonvolatile memory (401) are semiconductor memory, for example, read-only memories intended for use in read/write applications such as erasable programmable read-only memory (EPROM) or electrically erasable programmable read-only memory (EEPROM) or random-access memories such as a nonvolatile random-access memory (NVRAM).

The transaction file (415) records chronologically audit trails of the transactions from the beginning to the end. The transaction end is managed by using this transaction file (415) rather than the historical log file (418). The reason is as follows. In this embodiment, there are a plurality of historical log files (418). Accordingly, the log data for a single transaction is distributed and recorded in the historical log files (418a, 418b). This makes it indefinite which portion of which historical log file (418a or 418b) corresponds to the transaction end with this respect, the transaction end is recorded and managed in the transaction file (TRF)(415) that manages in the single file the time-sequential information from the beginning to the end of the transaction rather than managing the transaction end recorded in the historical log file (418). The transaction end is a data for use in recovering the database system. More specifically, a maintenance personnel detects the transaction end upon recovery, picks up the log data corresponding to the transactions up to the end, and recovers a database (419) according to the log data.

The log data is temporarily transferred to the historical log file buffers (414a, 414b) on the nonvolatile memory (401). This makes the log data to be nonvolatile and the log data is thus retained even when the system goes down. The log data transferred to the historical log file buffers (414a, 414b) are written in the historical log files (418a, 418b) in asynchronism with processing of the transactions. This processing is carried out by the log data writing unit (413). The log data writing unit (413) writes the log data from the historical log file buffers (414a, 414b) into the historical log files (418a, 418b) in parallel.

The processing to write the log data into the historical log file (418) is preferably made when the HLF buffer (414) becomes full. However, the timing is not limited to that and the data may be written in when other conditions are held.

In the second embodiment, the historical log file buffers (414a, 414b) are provided on the nonvolatile memory (401) along with the components described in conjunction with the first embodiment. Accordingly, it is possible to avoid loss of the log file as well as preventing the abuse due to the I/O neck.

It is noted that a plurality of volatile historical log file buffers may be provided for every classification in the main memory (main storage unit; MSU) (400). In such a case, the classified historical log data may be transferred to the historical log file buffers (414a, 414b) on the nonvolatile memory (401) after being temporarily stored in the volatile historical log file buffers. This allows more effective operation of the nonvolatile historical log file buffers (414a, 414b).

In addition, the transaction end required for the system recovery may be managed with being recorded in the transaction file (415) that records chronologically audit trails of the transactions from the beginning to the end. This permits easy retrieval of the transaction end even when two or more historical log files are presented for the respective classifications.

Third Embodiment

Figure 3:
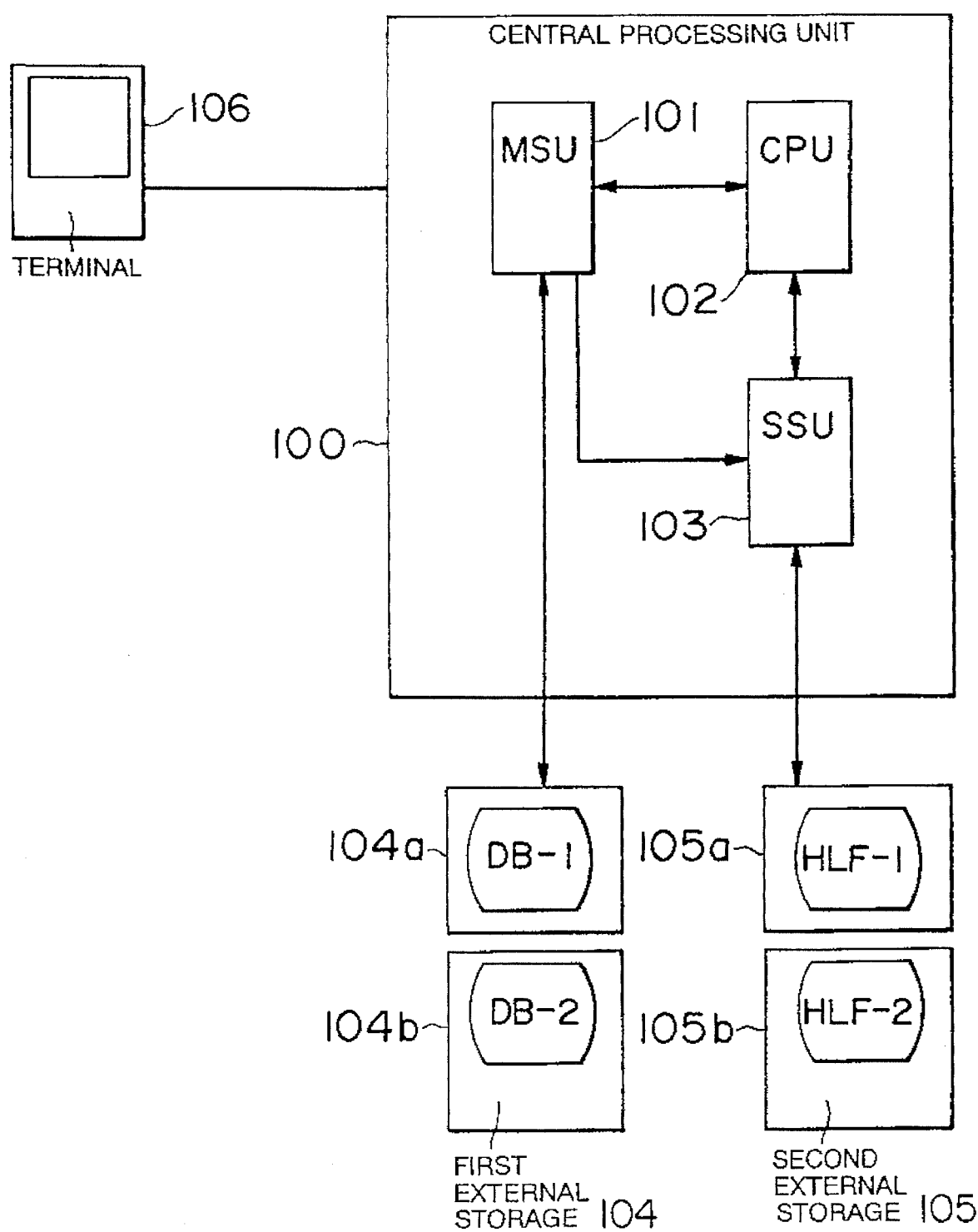
FIG. 3 is a block diagram showing the third embodiment of the present invention.
Figure 4:
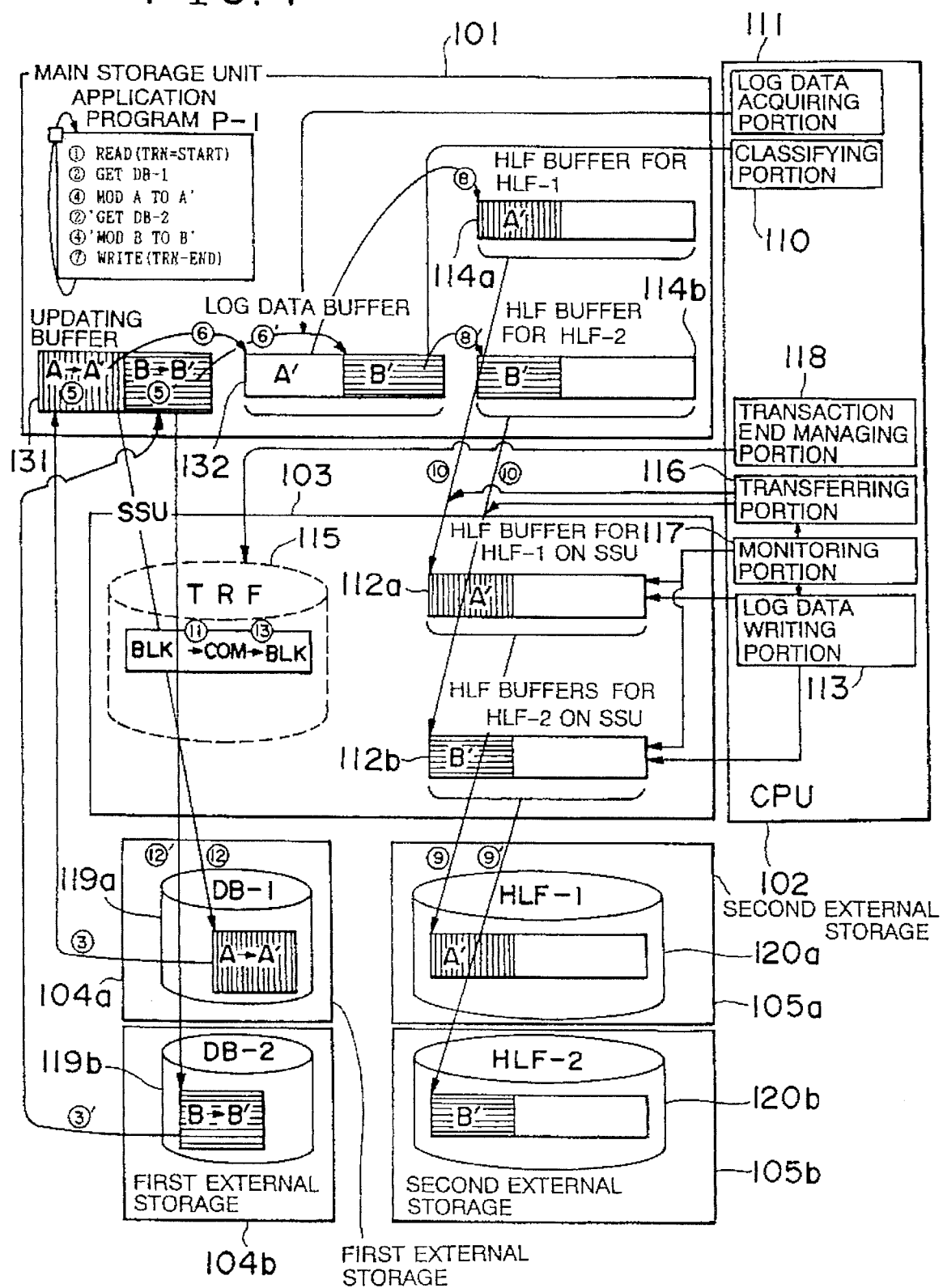
FIG. 4 is a block diagram showing the third embodiment more in detail than FIG. 3.
Figure 5:
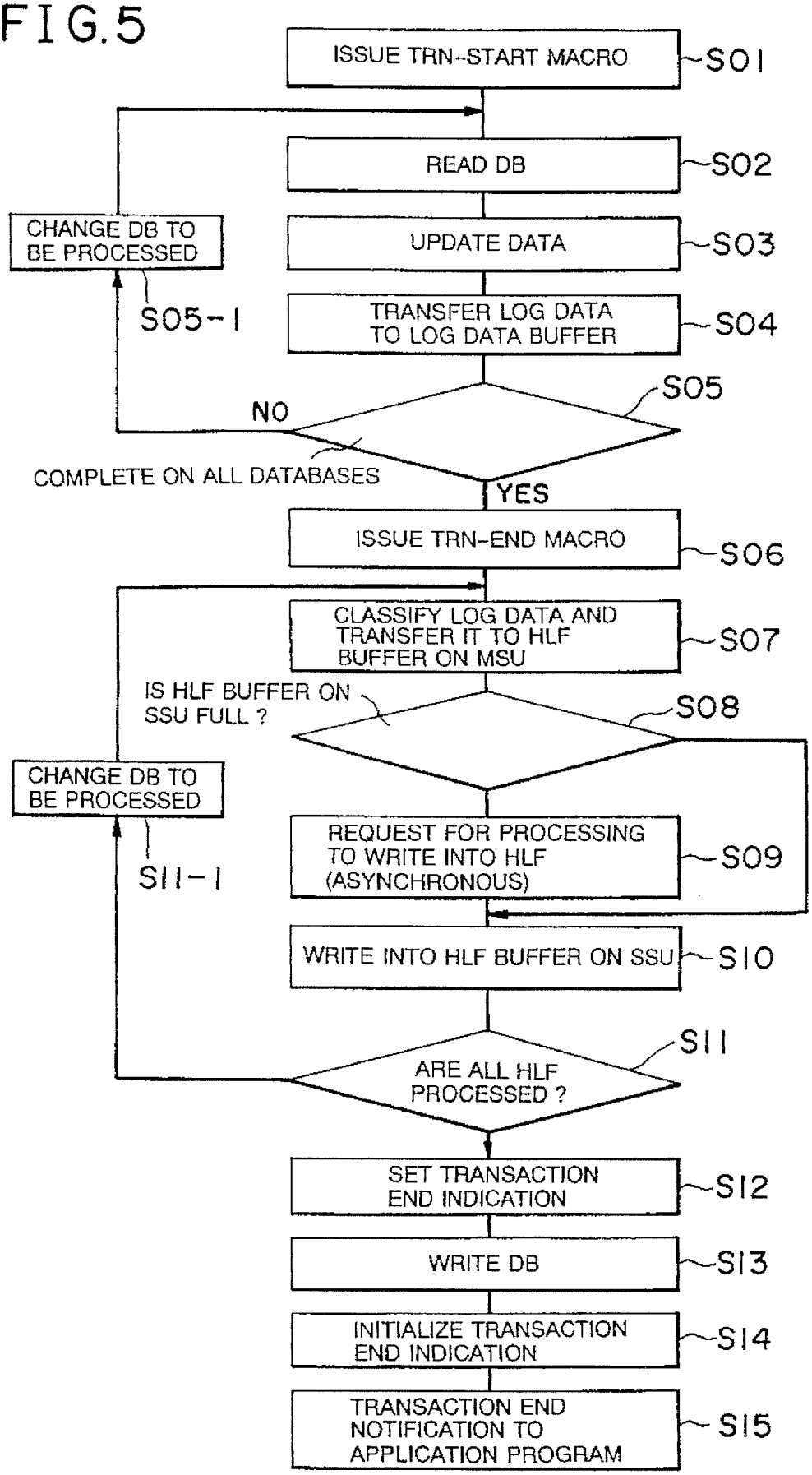
FIG. 5 is a flow chart illustrating a transaction for acquiring a log data carried out in the third embodiment of the present invention.

A third embodiment of the present invention is described in conjunction with FIGS. 3 through 5.

FIG. 3 is a schematic block diagram showing this embodiment. As shown in FIG. 3, the third embodiment is a case where the present invention is applied to the database system having two databases (DB-1, DB-2). This database system may be applied to an accounting management system. In such a case, one database (DB-1) is used as a depositing database and the other database (DB-2) is used as a withdrawing database.

This database system comprises first external storages (104a, 104b), collectively referred to as second external storage 105 a central processing unit (100), second external storages (105a, 105b) and a plurality of (only one of them is shown in FIG. 3) terminals (106). Two databases (DB-1 (119a) and DB-2 (119b)) are established in the first external storage (104). The central processing unit (100) is connected to the first external storage (104) and the second external storage (105). The central processing unit (100) is also connected to the terminals (106).

The central processing unit (100) is an information processing device for use in controlling the databases (DB-1 (119a), DB-2 (119b)) in response to a request supplied from a terminal (106). The central processing unit (100) comprises a main storage unit (MSU) (101), a nonvolatile mass memory (SSU) (103), and a CPU (102).

As shown in detail in FIG. 4, an application program is loaded on the main storage unit (101) and is executed. In addition, the main storage unit (101) is provided with database updating buffer (131) required for updating the database, a log data buffer (132) and a plurality of volatile HLF buffers (114). The classification condition of the log data is to be classified for every database, so that the number of the volatile HLF buffers 114 is equal to the number of the databases (DB-1 (119a), DB-2 (119b)) (that is two in FIG. 4). The main storage unit (101) is formed of a volatile random-access memory (RAM). In FIG. 4, an application program (P-1) is loaded on the main storage unit (101) to access successively the databases (DB-1 (119a), DB-2 (119b)) and to update them.

The nonvolatile mass memory (SSU) (103) is provided along with the main storage unit (101). Provided on the nonvolatile mass memory (103) are a transaction file 115 and a plurality of nonvolatile HLF buffers 112 of which number is equal to the number of the databases (DB-1 (119a), DB-2 (119b)). The nonvolatile mass memory (103) is formed of the NVRAM.

Historical log files (HLF-1 (120a), HLF-2 (120b)) are established in the second external storage 105. The historical log files (HLF-1 (120a), HLF-2 (120b)) are equal in number to the databases (DB-1 (119a), DB-2 (119b)) (that is two in FIG. 4).

The CPU (102) has a function of executing the application program loaded on the main storage unit (101) to control the databases (DB-1 (119a), DB-2 (119b)). In addition, the CPU 102 has another function obtained by means of executing an operation system (OS). More specifically, as shown in FIG. 4, the CPU (102) comprises a log data acquiring portion (111), a classifying portion (110), a transaction end managing portion (118), a transferring portion (116), a monitoring portion (117) and a log data writing portion (113).

Functions of the individual components are described more in detail.

The database updating buffer 131 stores the content of the databases (DB-1 (119a), DB-2 (119b)) in response to an instruction in the application program. The database updating buffer 131 updates the content A obtained from the first database (DB-1 (119a)) into a new content A' and updates the content B obtained from the second database (DB-2 (119b)) into a new content B'.

Figure 6:
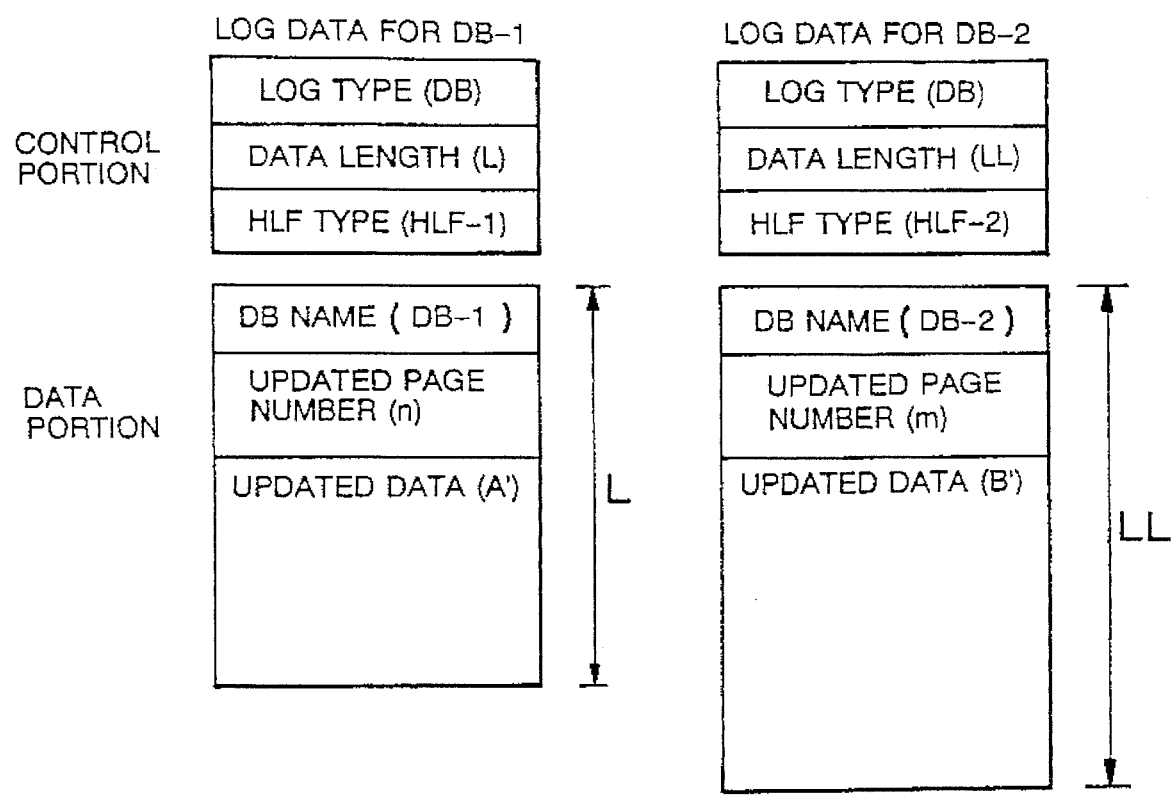
FIG. 6 is a view illustrating structure of the log data in a comparative manner.

The log data buffer (132) extracts the substance of the change (that is, command) of data in the database updating buffer (131) and hold it as the log data in response to an instruction supplied from the log data acquiring portion (111). Structure of the log data is described now. As shown in FIG. 6, each log data consists of a control portion and a data portion. The control portion consists of a log type indicating portion, a data length indicating portion and an HLF type indicating portion. The log type indicating portion represents whether the log is a log associated with update of the database or a log associated with the user data. The data length indicating portion represents the length of the data portion. The HLF type indicating portion specifies the name of the historical log file in which the log data is to be stored. The data portion consists of a DB name indicating portion, an updated page number indicating portion and an updated data storing portion in the case that the log data is involved in the database. The DB name indicating portion indicates with which database the log data in question is associated.

The updated page number indicating portion indicates with which page in the database the log data in question is associated. The updated data storing portion stores the updated data. The log data buffer (132) is provided with such log data in the time-sequential order.

The classifying portion (110) classifies the log data stored in the log data buffer (132) according to the classification conditions to transfer them to a plurality of volatile HLF buffers (141a, 141b). More specifically, the classifying portion (110) refers the HLF type indicating portion in the control portion of the log data to allocate the destination of transferring of the log data depending on the recorded content thereof. The destination may be allocated depending on the recorded content of the DB name indicating portion of the data portion of the log data.

Each of the volatile HLF buffers (141a, 141b) temporarily stores the log data for the individual databases (DB-1 (119a), DB-2 (119b)) classified by the classifying portion (110).

Each of the nonvolatile HLF buffers (112a, 112b) is supplied with the content of the log data stored in the associated volatile HLF buffer (114a or 114b) and transferred therefrom. The content of the log data is then rendered volatile. The log data so rendered volatile is retained even when the system goes down. Accordingly, it becomes unnecessary to write the log data into the historical log files (HLF-1 (120a), HLF-2 (120b) synchronously with the processing of the transaction). Transference from the volatile HLF buffers (141a, 141b) to the nonvolatile HLF buffers (112a, 112b), respectively, is made at an extremely high speed because no I/O processing is required. Writing from the nonvolatile HLF buffers (112a, 112b) to the historical log files (HLF-1 (120a), HLF-2 (120b)) may be made when the nonvolatile HLF buffers (112a, 112b) become full. Accordingly, it is preferable that the capacity of the nonvolatile HLF buffers (112a, 112b) is as large as possible to reduce the number of writing cycles into the historical log files (HLF-1 (120a), HLF-2 (120b)) and to relieve the I/O neck as possible.

The monitoring portion (117) monitors whether the nonvolatile HLF buffers (112a, 112b) become full. If there is an insufficient capacity of an empty space to transfer the log data stored in the volatile HLF buffers (114a, 114b), the monitoring portion (117) instructs the writing portion (113) to write the data. On the other hand, if there is a sufficient capacity of the empty space to transfer the log data stored in the volatile HLF buffers (114a, 114b), the monitoring portion (117) instructs the transferring portion (116) to transfer the data.

The log data writing portion (113) writes the log data stored in the nonvolatile HLF buffers (112a, 112b) into the associated historical log files (HLF-1 (120a), HLF-2 (120b)) in response to the instruction of writing.

The transferring portion (116) transfers the log data stored in the volatile HLF buffers (141a, 141b) to the nonvolatile HLF buffers (112a, 112b) in response to the instruction of transference.

The transaction file (115) is a file for use in managing the time-sequential information from the beginning to the end of the transactions. The transaction file (115) records the transaction end. The transaction end means a time instant when the transaction is ended.

The transaction end managing portion (118) detects the transaction end and records the transaction end in the transaction file (115). The transaction end managing portion (118) also has a function of detecting completion of writing of the updated data to the databases (119a, 119b) and deleting the transaction end from the transaction file (115).

The first external storages (104a, 104b) are equal in number to the databases (119a, 119b) (that is two in FIGS. 3 and 4). In addition, the second external storages (105a, 105b) are equal in number to the historical log files (120a, 102b) (that is two in FIGS. 3 and 4).

<Flow of Processing of Transactions>

Flow of processing of transactions in the third embodiment is described in conjunction with a flow chart of transaction processing illustrated in FIG. 5.

Step S01 is issue of the TRN-START (transaction-start) macro instruction. In this event, a transaction begins by means of issuing the TRN-START macro instruction.

The processing enters a loop at steps S02 through S05. During this loop, the processing at steps S02 through S04 is carried out successively on each of the databases (DB-1 (119a), DB-2 (119b)). More specifically, the first database (DB-1 (119a)) is subjected to the processing during the first loop while the second database (DB-2 (119b)) is subjected to the processing during the second loop.

Step S02 is reading of the databases (DB-1 (119a), DB-2 (119b)). At this step, a page where the data to be updated is stored is read into the updating buffer (131) on the main storage unit (101).

Step S03 is update of the data. At this step, the data is updated on the updating buffer (131).

Step S04 is transference of the log data to the log data buffer (132). At this step, the log data acquiring portion (111) extracts a command associated with database updating from the data left in the updating buffer (131) to obtain the log data. The log data is then transferred to the log data buffer (132) on the main storage unit (101).

Step S05 is determining of whether the processing at steps S02 through S04 has already carried out on all databases (DB-1 (119a), DB-2 (119b)). If there is a database left being unprocessed, step S05-1 is carried out to change the database to be processed. Then the processing proceeds to the step S02. On the other hand, if the processing on all database is completed, step S06 is executed.

Step S06 is issue of the TRN-END (transaction-end) macro instruction. At this step, the TRN-END macro instruction is issued. In response to this instruction, the application program P-1 passes the processing to the operation system (OS).

Next, the processing enters a loop at steps S07 through S11. During this loop, the processing at steps S07 through S10 is carried out successively on each of the log data of the databases (DB-1 (119a), DB-2 (119b)). More specifically, the log data associated with the first database (DB-1 (119a)) is subjected to the processing during the first loop while the log data associated with the second database (DB-2 (119b)) is subjected to the processing during the second loop.

Step S07 is classification and transference of the log data. More specifically, the classifying portion (110) classifies and extracts the log data associated with the database (DB-1 (119a) or DB-2 (119b)) directed to the processing from the log data stored in the log data buffer 132. The extracted log data is transferred to the HLF buffer (114) on the main storage unit (101). More specifically, the log data associated with the first database (DB-1 (119a)) is transferred to the HLF buffer (114a) for the HLF-1 during the first loop. The log data associated with the second database (DB-2 (119b)) is transferred to the HLF buffer (114b) for the HLF-2 during the second loop.

Step S08 is check on whether the HLF buffer (112) on the nonvolatile mass memory (103) is full. At this step, the monitoring portion (117) checks whether the HLF buffer (112) on the nonvolatile mass memory (103) is full. More specifically, the monitoring unit (117) checks the HLF buffer (112a) on the nonvolatile mass memory (103) for the HLF-1 during the first loop and checks the HLF buffer (112b) on the nonvolatile mass memory (103) for the HLF-2 during the second loop. Depending on the check result, the processing at step S09 is carried out when the HLF buffer (112) is full while the processing at step S10 is executed when the HLF buffer (112) is not full.

Step S09 is a request for processing to write the log data into the historical log files (HLF-1 (120a), HLF-2 (120b)). At this step, the monitoring portion (117) requires the log data writing portion (113) to write the content of the HLF buffer (112) on the nonvolatile mass memory (103) into the associated historical log file (HLF-1 (120a), HLF-2 (120b)). More specifically, the content of the HLF buffer (112a) on the nonvolatile mass memory (103) for the HLF-1 is written into the first historical log file (HLF-1 (120a)) during the first loop. The content of the HLF buffer (112b) on the nonvolatile mass memory (103) for the HLF-2 is written into the second historical log file (HLF-2 (120b)) during the second loop. The processing to write the log data into the historical log files (120a, 120b) is carried out in asynchronism with the transaction processing. Accordingly, the writing processing once carried out permits the processing to enter the step S10 regardless of whether the writing processing is completed or not.

Step S10 is a transference processing to transfer the log data stored in the HLF buffer (114) on the main storage unit (101) to the HLF buffer (112) on the nonvolatile mass memory (103). At this step, the transferring portion (116) transfers the content of the HLF buffer (114) on the main storage unit (101) to the HLF buffer (112) on the nonvolatile mass memory (103) to render the transferred content volatile. More specifically, the content of the HLF buffer (114a) for the HLF-1 is transferred to the HLF buffer (112a) on the nonvolatile mass memory (103) for the HLF-1 during the first loop. The content of the HLF buffer (114b) for the HLF-2 is transferred to the HLF buffer (112b) on the nonvolatile mass memory (103) for the HLF-2 during the second loop. The main storage unit (101) and the nonvolatile mass memory (103) are connected to each other through a bus, so that the data transference between them can be made at a high speed.

Subsequent step S11 is check on whether the processing for all HLF has completed. Completion of the processing for all HLF means that the log data stored in all HLF buffers (114a, 114b) on the main storage unit (101) are written into the HLF buffers (112a, 112b) on the nonvolatile mass memory (103). If writing of all log data is completed, the processing at step S12 is carried out. On the other hand, if any log data is left without being processed yet, step S11-1 is carried out to change the database to be processed. Then the processing goes back to the step S07.

Step S12 is set of the transaction end indication. At this step, the transaction end managing portion (116) sets indication of completion of the transaction to the transaction file (115). The time instant when the indication is set is considered as the transaction end.

Step S13 is writing of the database. At this step, the pages updated on the updating buffer (131) are written into the databases (DB-1 (119a), DB-2 (119b)).

Step S14 is initialization of the transaction end indication. At this step, the transaction end indication set into the transaction file (115) is initialized.

Step S15 is notification of the TRN-END (transaction-end) to the application program. At this step, the application program is notified of completion of the transaction.

<Details of Classification and Acquisition Processing for Log Data>

Next, described more in detail is a classification and acquisition processing for the log data in the transaction processing. This corresponds to the steps S01 through step S14 in FIG. 5.

(1) The application program P-1 issues a READ macro instruction. In response to this, a request from the terminal (106) is read out. During the processing of this READ macro instruction, the TRN-START (transaction-start) macro instruction is issued (corresponding to the step S01 in FIG. 5). The transaction is started in response to the TRN-START macro instruction.

(2) The application program issues the GET macro instruction. In response to this GET macro instruction, a necessary database (DB-1 (119a) is obtained exclusively by the transaction.

(3) The page where the requested data is stored is read into the main storage unit (101) to update the data in the database (DB-1 (119a)) (corresponding to the step S02 in FIG. 5).

(4) The application program issues the MODIFY macro instruction to modify the data.

(5) The data is changed from A into A' on the updating buffer (131) of the main storage unit (101) (corresponding to the step S03 in FIG. 5).

(6) The log data associated with the data updated in (5) is transferred to the log data buffer (132) of the main storage unit (101) (corresponding to the step S04 in FIG. 5).

(2)' through (5)' The same processing as those carried out for the database DB-1 is repeated for the second database (DB-2 (119b)).

(7) The application program P-1 issues the WRITE macro instruction. In response to this WRITE macro instruction, the terminal (106) is notified of the processing result. During processing of the WRITE macro instruction, the TRN-END (transaction-end) macro instruction is issued (corresponding to the step S06 in FIG. 5).

(8) The log data associated with the database (DB-1 (119a)) is extracted from the log data written in the log data buffer (132) of the main storage unit (101). The extracted data is transferred to the volatile HLF buffer (114a) for the HLF-1 on the main storage unit (101) (corresponding to the step S07 in FIG. 5).

(9) If the nonvolatile HLF buffer (112a) on the nonvolatile mass memory (103) is full, or with other conditions, the data in the nonvolatile HLF buffer (112a) on the nonvolatile mass memory (103) is written into the historical log file (120a) in the second external storage (105a) (corresponding to the steps S08 and S09 in FIG. 5).

(10) The data in the volatile HLF buffer (114a) for the HLF-1 is written into the nonvolatile HLF buffer (112a) on the nonvolatile mass memory (103) and the data is rendered volatile.

(8)' through (10)' The same processing as those carried out for the database DB-1 is repeated for the second database (DB-2 (119b)).

(11) The transaction end indication is set into the transaction file (115).

(12) The data associated with the first database (DB-1 (119a)) in the DB updating buffer (131) is written into the first database (DB-1 (119a)).

(12)' The same processing as those carried out for the database DB-2 is repeated for the second database (DB-2 (119b)).

(13) The transaction end indication in the transaction file (115) is initialized.

The log data written into the HLF buffers (112a, 112b) on the nonvolatile mass memory (103) as a result of the above mentioned processing are written into the historical log files (120a, 120b) during the subsequent processing.

<Recovery Operation on the Database (DB)>

Recovery operation on the database is described below.

When the database itself is crashed, the database involved in the failure is closed to prevent the application program from being used until the database is restored. When an I/O failure is caused during reading the database, the application program that detects the database failure is notified of occurrence of the I/O failure. When the I/O failure is caused during writing the database, the application program that detects the database failure is notified of establishment of the transaction. The database involved in the failure is restored therefrom by using a historical log file (HLF) in which contained are backup data obtained upon creation of the database and log data of the database.

When the system goes down, the operation differs depending on whether the system down is caused before or after the transaction end. More specifically, when the system goes down before the transaction ends, the system is first rerun. In this case, the DB is not updated and thus no specific operation is required. On the other hand, when the system goes down after the transaction ends, the system is first rerun. In this event, the operation system (OS) carries out a writing processing on the database by using the log data stored in the HLF buffer (112) on the nonvolatile mass memory (103) (103) before the initiation conditions for the application program are prepared. The database is thus brought back to its status at the time when a failure stopped the operation.

Fourth Embodiment

Figure 7:
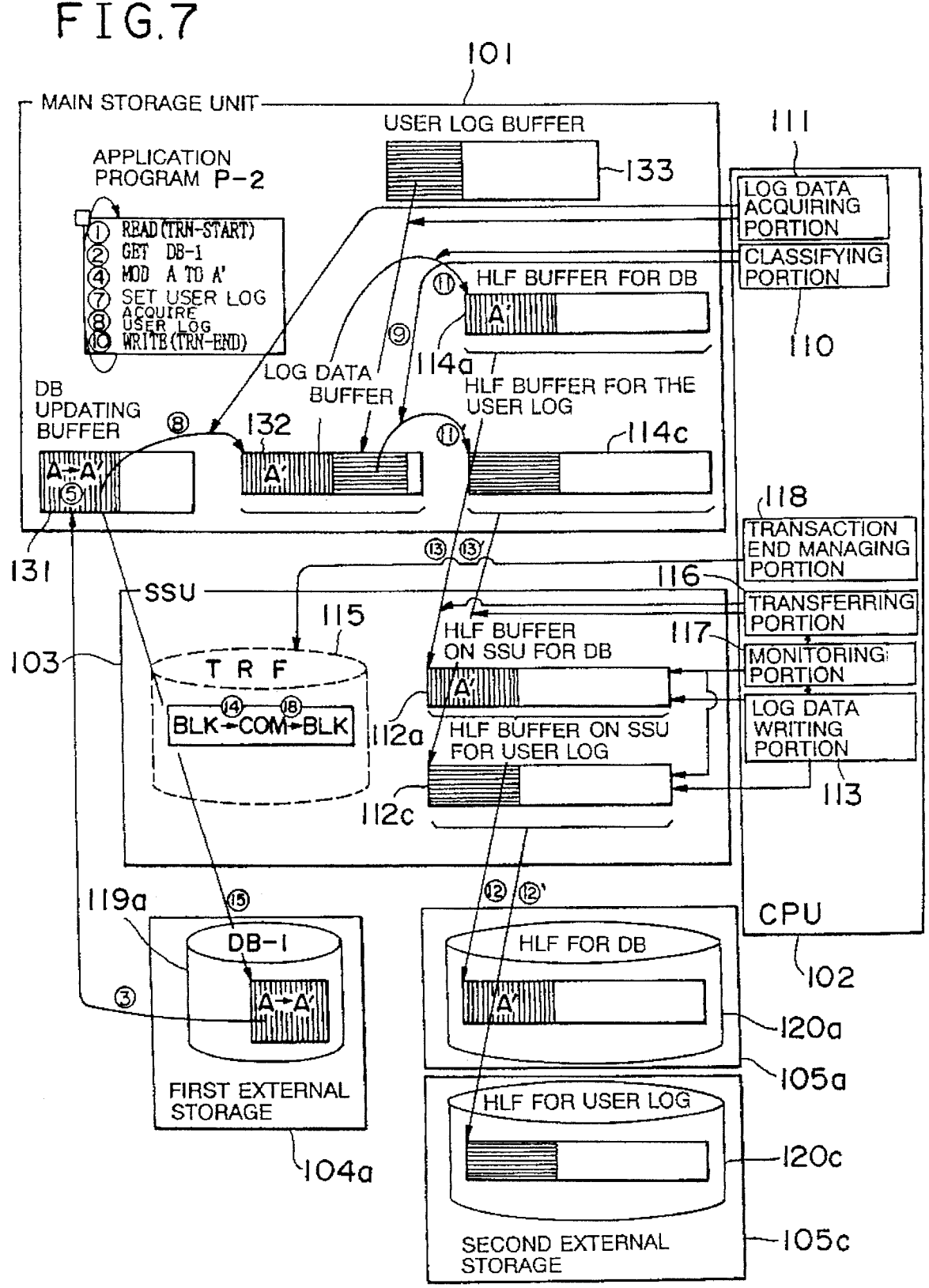
FIG. 7 is a block diagram showing the fourth embodiment of the present invention.
Figure 8:
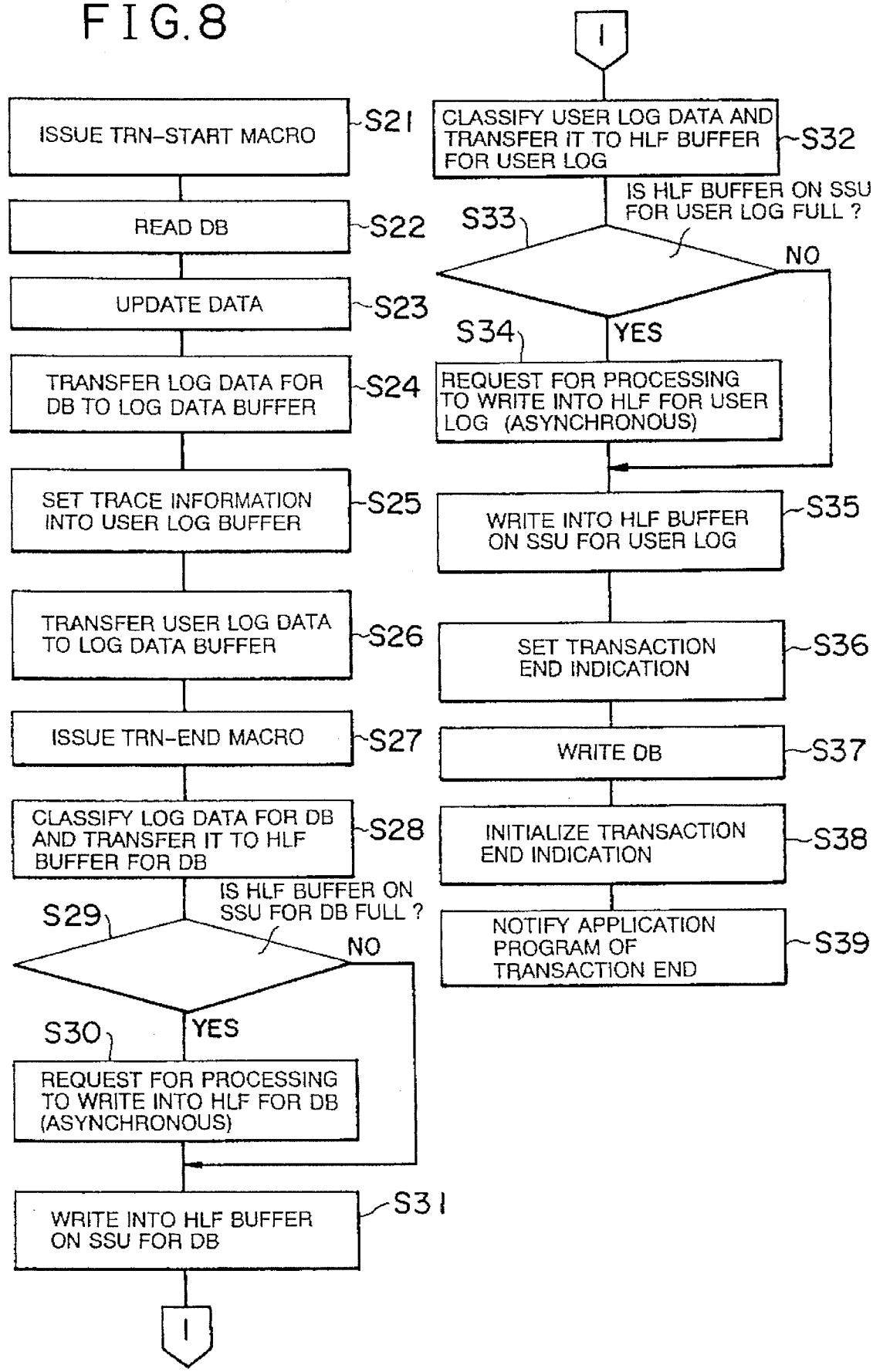
FIG. 8 is a flow chart illustrating a transaction for acquiring a log data carried out in the fourth embodiment of the present invention.

FIGS. 7 and 8 shows a fourth embodiment of a log data classifying and acquiring apparatus according to this invention. While a part of the components is omitted from the figures, the components described in conjunction with the third embodiment are all contained in this fourth embodiment. In FIG. 7, the same reference numerals as in third embodiment represent similar components that have equivalent functions to those described in the third embodiment. In addition, the fourth embodiment comprises a structure for classifying and acquiring a user log data. Description is made regarding to the additional component in this fourth embodiment.

In FIG. 7, an application program (P-2) is loaded on the main storage unit (101). The application program (P-2) is used for setting a user log as well as for accessing to the first database (DB-1 (119a)).

Figure 9:
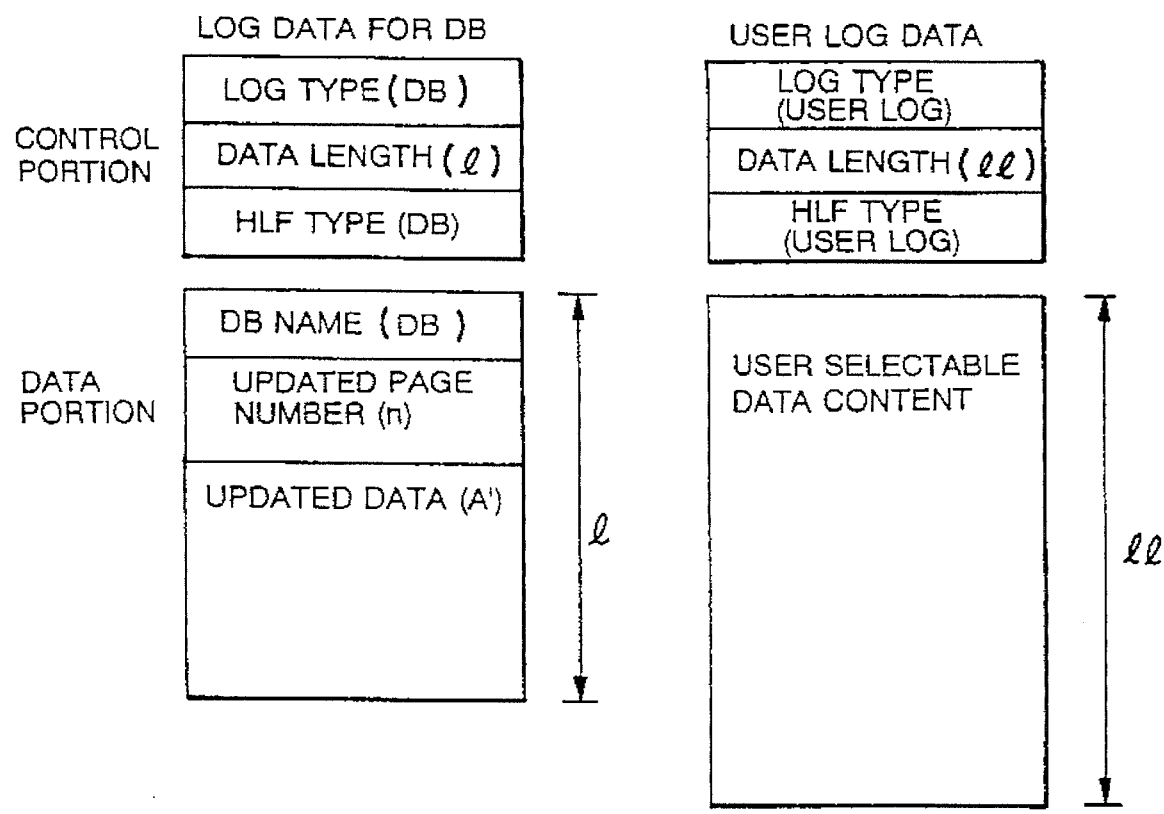
Figure 10:
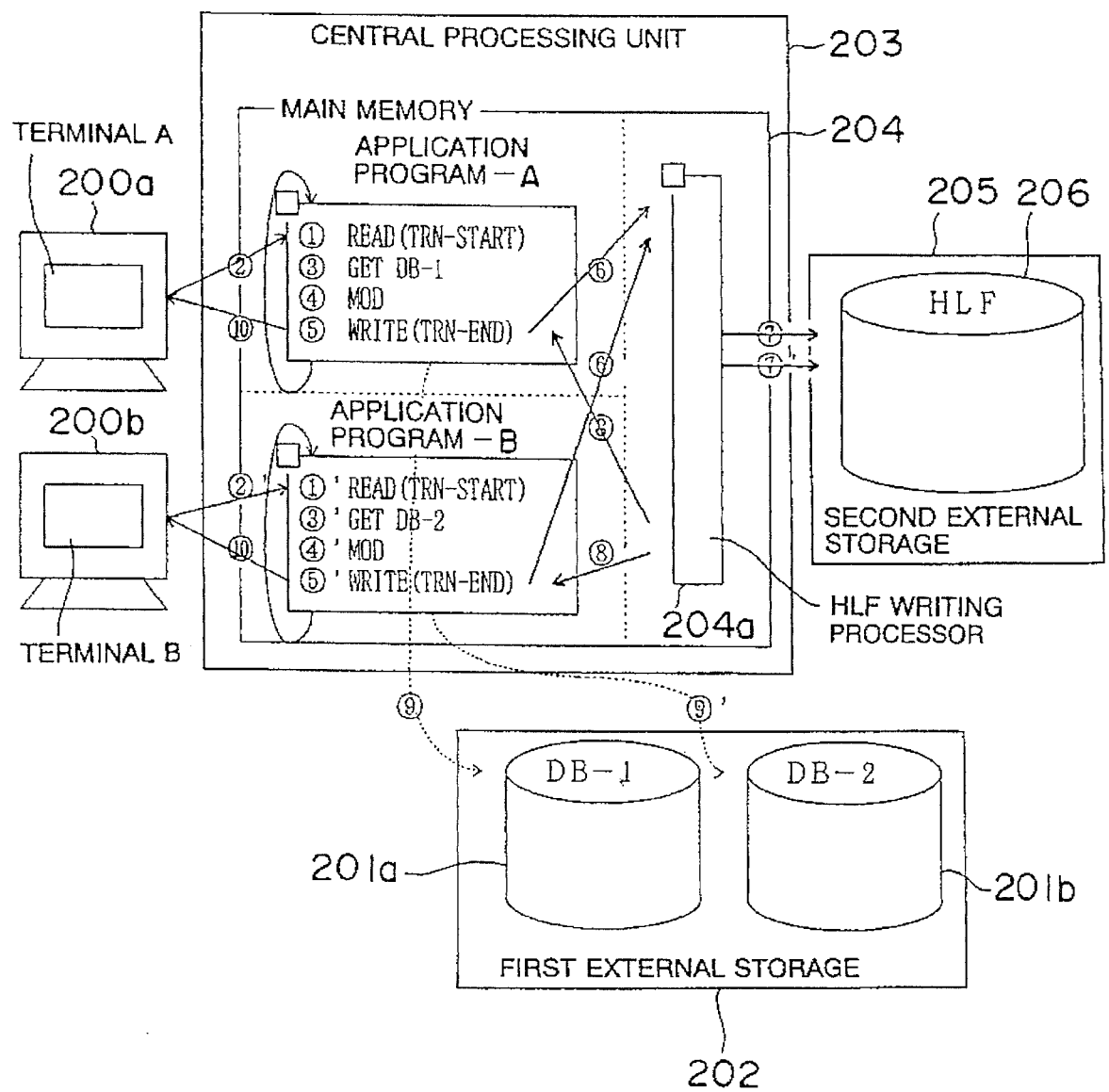
FIG. 10 is a block diagram showing a conventional art.
Figure 11:
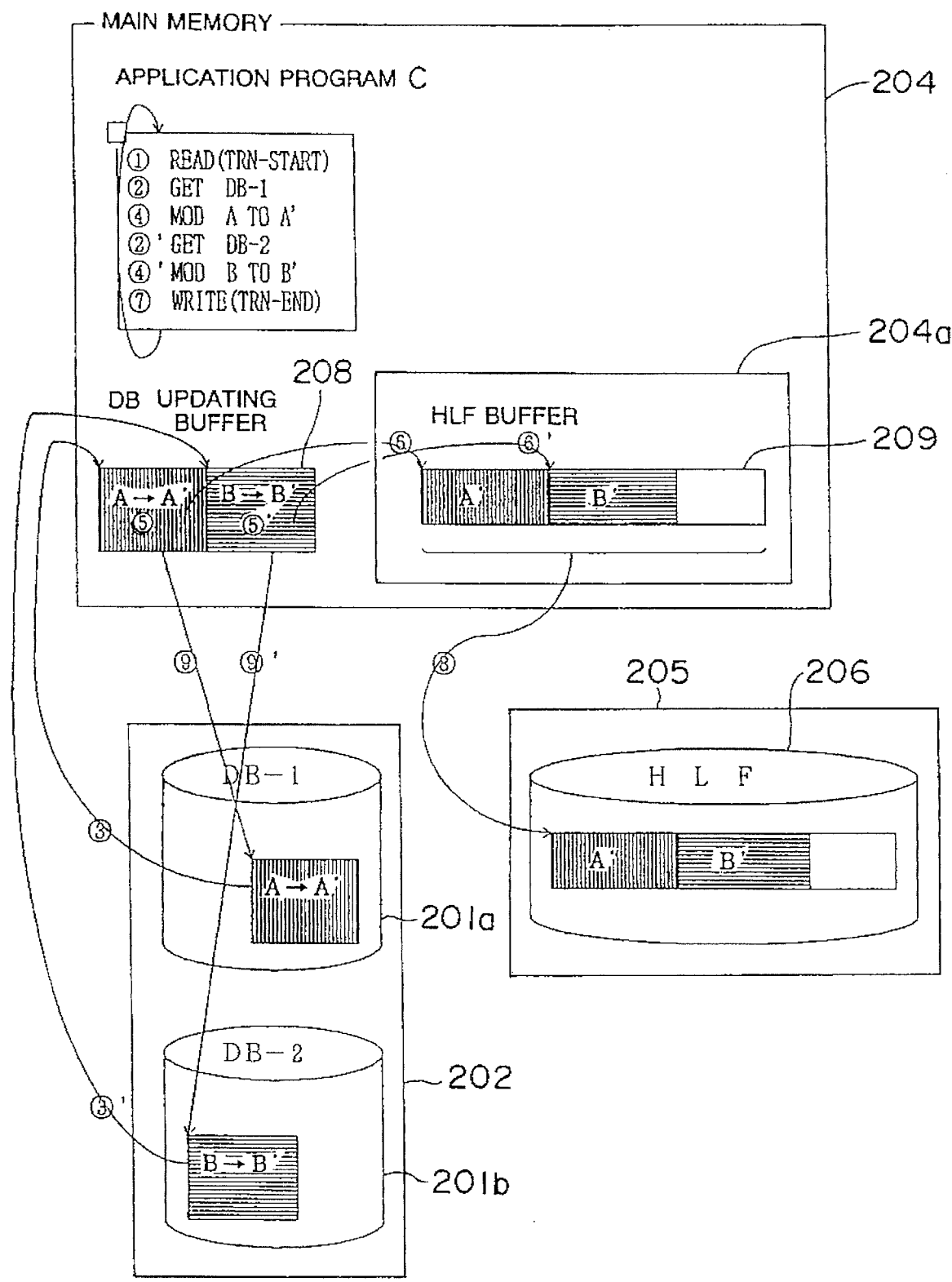
FIG. 11 is a schematic view for use in describing a flow of data in FIG. 10.

A user log buffer (133) on the main storage unit (101) is a buffer for receiving and storing user information such as statistic information for system tuning and accounting information for a user as the user log data for every one transaction. The user log data stored in the user log buffer (133) is transferred to the log data buffer (132) by the log data acquiring portion (111). Structure of the user log data is described hereinafter. As shown in FIG. 9, each user log data consists of a control portion and a data portion. The control portion consists of a log type indicating portion, a data length indicating portion and an HLF type indication portion. The log type indicating portion represents that the log is a log associated with the user data. The data length indicating portion represents the length of the data portion. The HLF type indicating portion specifies the historical log file in which the log data is to be stored. A data content that a user of the database sets arbitrary is described in the data portion. The log data buffer 132 is provided with such user log data and the log data for database (DB) in the time-sequential order.

The classifying portion (110) classifies the log data stored in the log data buffer (132) according to the classification conditions to transfer them to the HLF buffer (114a) for the database (DB) or an HLF buffer (114c) for the user log. More specifically, the classifying portion (110) refers the HLF type indicating portion in the control portion of the log data to allocate the destination of transferring depending on the recorded content thereof. The destination may be allocated depending on the presence or absence of the database (DB) name indication portion of the data portion or the recorded content of the log type indication portion of the control portion.

The HLF buffer (114c) for the user log on the main storage portion (101) temporarily stores the user log data classified by the classifying portion (110). The content of the log data stored in the HLF buffer (114c) for the user log on the main storage unit (101) is transferred by the transferring portion (116) to an HLF buffer (112c) on the nonvolatile mass memory (103) for the user log. The transferred data are then rendered volatile. The volatile log data retains even when the system goes down. Accordingly, it becomes unnecessary to write the log data into a historical log file (120c) for the user log synchronously with the processing of the transaction. Transference from an HLF buffer (114c) for the user log to the nonvolatile HLF buffer (112c) is made at an extremely high speed because no I/O processing is required. Writing from the nonvolatile HLF buffer (112c) to the historical log file (120c) may be made when the nonvolatile HLF buffer (112c) becomes full. Accordingly, it is preferable that the capacity of the nonvolatile HLF buffer (112c) is as large as possible to reduce the number of writing cycles into the historical log file (120c) and to relieve the I/O neck as possible.

The amount of occupation of the HLF buffer (112c) on the nonvolatile mass memory (103) for the user log is monitored by the monitoring portion (117). If the monitoring portion (117) determines that the capacity becomes full, the content in the HLF buffer (112c) on the Nonvolatile mass memory (103) for the user log is written into the HLF (120c) for the user log by the log data writing portion (113).

The historical log file (120c) for the user log where the user log data are finally stored is established on a second external storage (105c).

<Flow of Processing of Transaction>

Flow of processing of transactions in the fourth embodiment is described in conjunction with a flow chart of transaction processing illustrated in FIG. 8.

Step S21 is issue of the TRN-START (transaction-start) macro instruction. In this event, a transaction begins by means of issuing the TRN-START macro instruction.

Step S22 is reading of the database (DB-1 (119a)). At this step, a page where the data to be updated is stored is read into the updating buffer (131) on the main storage unit (101).

Step S23 is update of the data. At this step, the data is updated on the updating buffer (131).

Step S24 is transference of the log data to the log data buffer (132). At this step, the log data acquiring portion (111) extracts a command associated with database updating from the data left in the updating buffer (131) to obtain the log data for the database (DB). The log data is then transferred to the log data buffer (132) on the main storage unit (101).

Step S25 is set of the trace information into the user log. More specifically, the trace information obtained by means of tracing the updating of the database (DB-1 (119a)) is set into the user log buffer (133). Step S26 is transference of the user log data to the log data buffer (133). At this step, the log data acquiring portion (111) acquires the user log data from the data left in the user log buffer (133) and transfers the acquired data to the log data buffer (132) on the main storage unit (101).

Step S27 is issue of the TRN-END (transaction-end) macro instruction. At this step, the TRN-END macro instruction is issued. In response to this instruction, the application program P-2 passes the processing to the operation system (OS).

Step S28 is classification and transference of the log data. More specifically, the classifying portion 110 classifies and extracts the log data associated with the database (DB-1 (119a)) from the log data stored in the log data buffer 132. The extracted log data for the database (DB) is transferred to the HLF buffer (114a) on the main storage unit (101).

Step S29 is check on whether the HLF buffer (112a) on the nonvolatile mass memory (103) for the database (DB) is full. At this step, the monitoring portion (117) checks whether the HLF buffer (112) on the nonvolatile mass memory (103) is full. Depending on the result of the check, the processing at step S30 is carried out if the HLF buffer (112a) is full while the processing at step S31 is executed if the HLF buffer (112a) is not full.

Step S30 is a request for processing to write the log data into the historical log file (120a) for the database (DB). At this step, the monitoring portion (117) requires the log data writing portion (113) to write the content of the HLF buffer (112a) on the nonvolatile mass memory (103) for the database (DB) into the historical log file (120a) for the database (DB). The processing to write the log data into the historical log file (120a) is carried out in asynchronism with the transaction processing. Accordingly, the writing processing once carried out permits the processing to enter the step S31 regardless of whether the writing processing is completed or not.

Step S31 is a transference processing to transfer the log data stored in the HLF buffer (114a) on the main storage unit (101) to the HLF buffer (112a) on the nonvolatile mass memory (103). At this step, the transferring portion (116) transfers the content of the HLF buffer (114a) for the database (DB) on the main storage portion (101) to the HLF buffer (112a) on the nonvolatile mass memory (103) for the database (DB) to render the transferred content nonvolatile. The main storage unit (101) and the nonvolatile mass memory (103) are connected to each other through a bus, so that the data transference between them can be made at a high speed.

Step S32 is classification and transference of the log data. More specifically, the classifying portion (110) classifies and extracts the user log database from the log data stored in the log data buffer (132). The extracted user log data is transferred to the HLF buffer (114c) on the main storage unit (101).

Step S33 is check on whether the HLF buffer (112) on the nonvolatile mass memory (103) is full. At this step, the monitoring portion (117) checks whether the HLF buffer (112c) on the nonvolatile mass memory (103) for the user log is full. Depending on the result of the check, the processing at step S34 is carried out if the HLF buffer (112c) is full while the processing at step S35 is executed if the HLF buffer (112c) is not full.

Step S34 is a request for processing to write the log data into the historical log file (120c) for the user log. At this step, the monitoring portion (117) requires the log data writing portion (113) to write the content of the HLF buffer (112c) on the nonvolatile mass memory (103) for the user log into the historical log file (120c) for the user log. The processing to write the log data into the historical log file (120c) is carried out in asynchronism with the transaction processing. Accordingly, the writing processing once carried out permits the processing to enter the step S35 regardless of whether the writing processing is completed or not.

Step S35 is a transference processing to transfer the log data stored in the HLF buffer (114c) on the main storage unit (101) to the HLF buffer (112c) on the nonvolatile mass memory (103). At this step, the transferring unit (116) transfers the content of the HLF buffer (114c) for the user data on the main storage portion (101) to the HLF buffer (112c) on the nonvolatile mass memory (103) for the user data to rendered volatile the transferred content. The main storage unit (101) and the Nonvolatile mass memory (103) (103) are connected to each other through a bus, so that the data transference between them can be made at a high speed.

Step S36 is set of the transaction end indication. At this step, the transaction end managing portion (116) sets indication of completion of the transaction to the transaction file (115). The time instant when the indication is set is considered as the transaction end.

Step S37 is writing of the database. At this step, the pages updated on the updating buffer (131) are written into the database (DB-1 (119a)).

Step S38 is initialization of the transaction end indication. At this step, the transaction end indication set into the transaction file (115) is initialized.

Step S39 is notification of the TRN-END (transaction-end) to the application program. At this step, the application program is notified of completion of the transaction.

<Details of Classification and Acquisition Processing for Log Data>

Next, described more in detail is a classification and acquisition processing for the log data in the transaction processing. This corresponds to the steps S21 through step S38 in FIG. 8.

(1) The application program P-2 issues a READ macro instruction. In response to this, a request from the terminal (106) is read out. During the processing of this READ macro instruction, the TRN-START (transaction-start) macro instruction is issued (corresponding to the step S21 in FIG. 8). The transaction is started in response to the TRN-START macro instruction.

(2) The application program issues the GET macro instruction. In response to this GET macro instruction, a necessary database (DB-1 (119a)) is obtained exclusively by the transaction.

(3) The page where the requested data is stored is read into the main storage unit (101) to update the data in the database (DB-1 (119a)) (corresponding to the step S22 in FIG. 8).

(4) The application program issues the MODIFY macro instruction to modify the data.

(5) The data is changed from A into A' on the updating buffer (131) of the main storage unit (101) (corresponding to the step S23 in FIG. 8).

(6) The log data for the database (DB) associated with the data updated in (5) is transferred to the log data buffer (132) of the main storage unit (101) (corresponding to the step S24 in FIG. 8).

(7) The trace information for the updating of the database (DB) is set into the user log buffer (133) (corresponding to the step S25 in FIG. 8).

(8) A LOGWRITE USER LOG DATA ACQUIRING macro instruction is issued.

(9) The user log is transferred to the log data buffer (132) (corresponding to the step S26 in FIG. 8).

(10) The application program P-2 issues the WRITE macro instruction. In response to this WRITE macro instruction, the terminal (106) is notified of the processing result. During processing of the WRITE macro instruction, the TRN-END (transaction-end) macro instruction is issued (corresponding to the step S27 in FIG. 8).

(11) The log data for the database (DB) is extracted from the log data written in the log data buffer (132) of the main storage unit (101). The extracted data is transferred to the HLF buffer (114a) for the database (DB) on the main storage unit (101) (corresponding to the step S28 in FIG. 8).

(12) If the nonvolatile HLF buffer (112a) on the nonvolatile mass memory (103) for the database (DB) is full, or with other conditions, the data in the nonvolatile HLF buffer (112a) on the nonvolatile mass memory.(103) for the database (DB) is written into the historical log file (120a) for the database (DB) in the second external storage (105a) (corresponding to the steps S29 and S30 in FIG. 8).

(13) The data in the volatile HLF buffer (114a) for the database (DB) is written into the nonvolatile HLF buffer (112a) on the nonvolatile mass memory (103) for the database (DB) and the data is rendered volatile (corresponding to the step S31 in FIG. 8).

(11)' The user log data is extracted from the log data written in the log data buffer (132) of the main storage unit (101). The extracted data is transferred to the HLF buffer (114c) for the user log on the main storage unit (101) (corresponding to the step S32 in FIG. 8).

(12)' If the nonvolatile HLF buffer (112c) on the nonvolatile mass memory (103) for the user log is full, or with other conditions, the data in the nonvolatile HLF buffer (112c) on the nonvolatile mass memory (103) for the user log is written into the historical log file (120c) for the user log in the second external storage (105a) (corresponding to the steps S33 and S34 in FIG. 8).

(13)' The data in the volatile HLF buffer (114c) for the user log is written into the nonvolatile HLF buffer (112c) on the nonvolatile mass memory (103) for the user log and the data is rendered volatile (corresponding to the steps S35 in FIG. 8).

(14) The transaction end indication is set into the transaction file (115).

(15) The data associated with the database (DB-1 (119a)) in the DB updating buffer (131) is written into the database (DB-1 (119a)).

(16) The transaction end indication in the transaction file (115) is initialized.

The log data written into the HLF buffers (112a, 112b) on the nonvolatile mass memory (103) as a result of the above mentioned processing are written into the historical log files (120a, 120c) during the subsequent processing.

<Advantages of the Invention>

(1) According to the present invention, the load of writing processing of the historical log file can be distributed by means of providing a plurality of historical log files. As a result, it is possible to solve the problem of the I/O neck of the historical log file involved in the conventional log data acquiring processing system. This extremely improves the transaction performance, allowing establishment of a large-scale database (DB) system.

(2) If the scale of business is enlarged with some additional jobs, the transaction performance is deteriorated in the conventional system due to the I/O neck of the historical log file. The present invention makes it possible to add jobs and works without causing deterioration of the transaction performance due to the I/O neck of the historical log file only by means of adding the historical log files.

(3) In addition, following services can be provided by means of classifying and acquiring the log data.

First, DB recovery operation can be provided by each database (group). More specifically, all data in a conventional, single historical log file are input data essential for the database recovery. However, the present invention makes it possible to manage the input data for the database recovery independently of each other database (group) by means of acquiring the log data by every database. In addition, the log data of the database (DB) to be recovered can be retrieved for a shorter time, allowing reduction of the time for the DB recovery operation.

Second, the user data can be classified previously. More specifically, the user data acquiring function requiring no extraction operation can be realized by means of acquiring the user data and the log data with being classified.

The invention being thus described, it will be obvious that the same may be varied in may ways. Such variations are not to be regarded as a departure from the spirit and scope of the invention, and all such modifications as would be obvious to one skilled in the art are intended to be included within the scope of the following claims.

What is claimed is:

1. An apparatus for classifying and acquiring log data in a database system that updates the log data through an execution of a transaction and stores the updated log data in a storage device, comprising:

log data acquiring means for acquiring a plurality of log data for each individual transaction executed by a same processor;

log data classifying means for classifying the plurality of log data acquired by said log data acquiring means into a plurality of groups of log data according to a predetermined classification condition;

a plurality of buffers for storing said plurality of groups of log data classified by said log data classifying means, respectively, each of said plurality of buffers being associated with the predetermined classification condition; and a plurality of historical log files, provided within the storage device, for storing said plurality of groups of log data written from the plurality of buffers, respectively, said plurality of historical log files being associated with the predetermined classification condition.

2. An apparatus as claimed in claim 1, wherein the storage device is an external storage device.

3. An apparatus as claimed in claim 2 further comprising log data writing means for writing the plurality of groups of log data from said plurality of buffers into the plurality of historical log files within the external storage device in asynchronism with the execution of the transactions.

4. An apparatus as claimed in claim 3, wherein said log data writing means writes the corresponding groups of log data from said buffers into the plurality of historical log files in a parallel manner.

5. An apparatus as claimed in claim 1 further comprising a nonvolatile memory, wherein said buffers are nonvolatile buffers provided on the nonvolatile memory.

6. An apparatus as claimed in claim 5 further comprising a plurality of volatile buffers as internal devices, wherein the volatile buffers are associated with the predetermined classification condition, and wherein the groups of log data are temporarily stored in the volatile buffers and then transferred to the nonvolatile buffers.

7. An apparatus as claimed in claim 1 further comprising:

a transaction file for using in recording an audit trail of the transactions; and transaction end managing means for managing a transaction end in said transaction file, said transaction end managing means recording the transaction end in said transaction file at the time when the corresponding group of log data is ensured in one of the historical log files provided within the storage in the case of the transaction end.

8. An apparatus as claimed in claim 1 further comprising a plurality of databases, wherein said log data classifying means classifies the log data for each of the plurality of databases.

9. An apparatus as claimed in claim 1, wherein said log data classifying means classifies the log data for every group of databases.

10. An apparatus as claimed in claim 1, wherein said log data classifying means classifies updated log data for a database and user log data including types of data other than the updated log data to supply the classified updated and user log data to a plurality of log files.

11. A method for classifying and acquiring log data in a database system that updates the log data through an execution of a transaction and stores the updated log data in a log file, comprising the steps of:

acquiring a plurality of log data for each individual transaction executed by a same processor;

classifying the acquired plurality of log data into a plurality of groups of data according to a predetermined classification condition;

storing the plurality of groups of log data respectively into a plurality of buffers, each of said plurality of buffers being associated with the predetermined classification condition; and writing the plurality of groups of log data stored in the plurality of buffers respectively into a plurality of log files, each of said plurality of log files being associated with the predetermined classification condition.

12. A method as claimed in claim 11, wherein the groups of log data are stored in corresponding nonvolatile buffers each being associated with the predetermined classification condition.

13. A method as claimed in claim 12, wherein the groups of log data stored in the nonvolatile buffers are written into log files if the nonvolatile buffers are full before the classified log data are stored in the nonvolatile buffers, following which the classified log data are stored in the nonvolatile buffers.

14. A method as claimed in claim 12, wherein the classified groups of log data are temporarily stored in a plurality of volatile buffers each being associated with the predetermined classification condition before the groups of log data are written into the nonvolatile buffers.

15. A method as claimed in claim 11, wherein the groups of log data are classified for individual databases.

16. A method as claimed in claim 11, wherein user log data and updated log data for a database are classified and supplied to the plurality of log files.

* * * * *

UNITED STATES PATENT AND TRADEMARK OFFICE
CERTIFICATE OF CORRECTION

PATENT NO. : 5,544,359
DATED : August 6, 1996
INVENTOR(S) : Masayuki TADA et al.

It is certified that error appears in the above-indentified patent and that said Letters Patent is hereby corrected as shown below:

Column 2, lines 17 and 21, "(1)'-(b)'" should be --(1)' - (6)'--.

line 20, "(1)'-(b)'" should be --(1)' - (6)'--; and line 33, "(7)'-(10)'" should be --(7)' - (10)'--.

Column 7, line 56, "second" should be --first--;

line 57, "105" should be --104,--; and line 58, after "(105a, 105b)" insert --, collectively referred to as second external storage 105--.

Column 10, line 55, delete "-".

Column 15, line 18, before "Step" insert new paragraph.

Column 17, line 42, delete ".".

Signed and Sealed this

Twenty-fourth Day of December, 1996

Attest:

BRUCE LEHMAN

*Attesting Officer*           *Commissioner of Patents and Trademarks*